United States Patent
Chen et al.

(10) Patent No.: US 8,643,317 B2
(45) Date of Patent: Feb. 4, 2014

(54) SINGLE PHASE DC BRUSHLESS MOTOR CONTROLLER AND METHOD FOR CONTROLLING ROTATION SPEED AND DIRECTION OF SINGLE PHASE DC BRUSHLESS MOTOR

(75) Inventors: Lee-Long Chen, Taoyuan Hsien (TW);
Ya-Sen Tu, Taoyuan Hsien (TW);
Chia-Ching Tsai, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 330 days.

(21) Appl. No.: 13/085,916

(22) Filed: Apr. 13, 2011

(65) Prior Publication Data
US 2012/0068642 A1   Mar. 22, 2012

(30) Foreign Application Priority Data
Sep. 21, 2010   (TW) ................ 99131905 A (51) Int. Cl.
*H02P 6/00*   (2006.01)
(52) U.S. Cl.
USPC ............... 318/400.01; 318/400.26; 318/599; 318/716
(58) Field of Classification Search
USPC .......... 318/400.01, 400.26, 400.38, 715, 719, 318/721, 599, 254.1, 256, 257, 268
See application file for complete search history.

(56) References Cited

U.S. PATENT DOCUMENTS

| | | | | |
|---|---|---|---|---|
| 3,739,248 A | * | 6/1973 | Wehde | 318/400.41 |
| 5,675,231 A | * | 10/1997 | Becerra et al. | 318/801 |
| 5,838,127 A | * | 11/1998 | Young et al. | 318/293 |
| 6,191,513 B1 | * | 2/2001 | Chen et al. | 310/90 |
| 6,563,284 B2 | * | 5/2003 | Teutsch et al. | 318/599 |
| 6,977,478 B2 | * | 12/2005 | Biamonte et al. | 318/824 |

FOREIGN PATENT DOCUMENTS

CN   101594106 A   12/2009

OTHER PUBLICATIONS

CN Office Action dated Jun. 18, 2013.

* cited by examiner

*Primary Examiner* — Bentsu Ro
*Assistant Examiner* — Thai Dinh
(74) *Attorney, Agent, or Firm* — Muncy, Geissler, Olds & Lowe, PLLC (57) ABSTRACT

A single phase DC brushless motor controller, including: a micro control unit including: a Pulse Width Modulation (PWM) pin for receiving a PWM signal from a system; and a commutation logic unit for controlling the speed and rotation of a single phase DC brushless motor according to the PWM signal.

6 Claims, 7 Drawing Sheets

SINGLE PHASE DC BRUSHLESS MOTOR CONTROLLER AND METHOD FOR CONTROLLING ROTATION SPEED AND DIRECTION OF SINGLE PHASE DC BRUSHLESS MOTOR

CROSS REFERENCE TO RELATED APPILCATIONS

This Non-provisional application claims priority under 35 U.S.C. §119(a) on Patent Application No(s). 99131905, filed in Taiwan, Republic of China on Sep. 21, 2010, the entire contents of which are hereby incorporated by reference.

BACKGROUND OF THE INVENTION

1. Field of the Invention

The present invention relates to a single phase DC brushless motor, and in particular relates to a single phase DC brushless motor controller and method for controlling the rotation speed and direction of the single phase DC brushless motor.

2. Description of the Related Art

Compared with brush motors, brushless motors can commutate (reverse the rotation direction) without brushes and thus have better structural reliability and rotation efficiency, consume less power and make less noise. DC brushless motors usually have sizes smaller than AC brushless motors and are widely used in various electronic devices such as heat dissipating fans.

Figure 1:
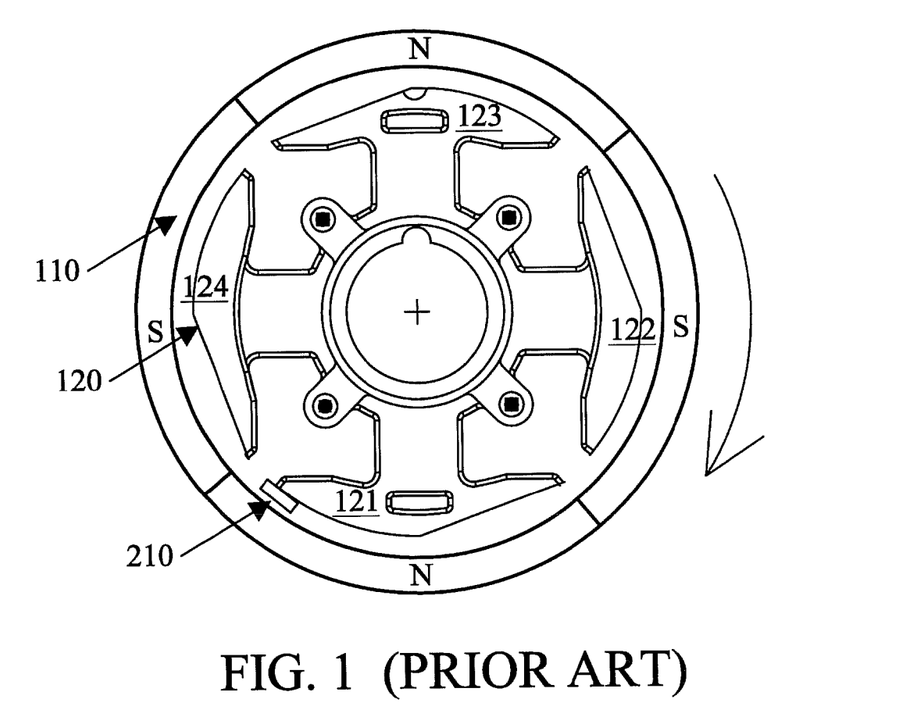
FIG. 1 is a schematic diagram of a conventional single phase DC brushless motor.

FIG. 1 is a schematic diagram of a conventional single phase DC brushless motor. The DC brushless motor 100 includes a rotator 110 and a stator 120, where the rotator 120 can rotate in relation to the stator 110. The rotator 110 has a plurality of magnetic poles (four poles in FIG. 1). Each of magnetic poles may be a permanent magnet, and has a magnetic field opposite to its adjacent magnetic poles (N pole or S pole). The stator 120 has the same number of magnetic poles as the rotator 110, and the magnetic poles of the stator 120 are respectively disposed on laminations (there are four laminations 121~124 on the stator 120 in FIG. 1). However, different from the permanent magnet of the rotator 110, the magnetic field of the magnetic poles of the stator 120 are created by the coils winded around the magnetic poles, where the winding style of the coils may be radial or axial.

In order to prevent the brushless motor from starting at a commutating dead angle, each lamination (121, 122, 123 or 124) of the stator 120 has two wings 121 (as shown in FIG. 1) which have different sizes and are spaced from the rotator 110 with gaps of different sizes. In FIG. 1, when the lamination 121 is excited to be an N pole, which repels the magnetic field of the part of the rotator 110 which is facing the lamination 121, the two unbalanced wings of the lamination 121 will generate two different repelling forces in relation to the rotator 110 and rotate the rotator 110 clockwise. However, due to the commutating dead angle, reversing the rotation direction of the single phase DC brushless motor is not possible. Therefore, the single phase DC brushless motor of the prior art can only rotate in one direction.

Uni-directional rotation limits the use of the single phase DC brushless motor. To improve the ability of the single phase DC brushless motor, a motor controller which makes the motor of the prior art rotate bi-directionally is needed.

BRIEF SUMMARY OF THE INVENTION

The present invention provides a single phase DC brushless motor controller, including: a micro control unit including: a Pulse Width Modulation (PWM) pin for receiving a PWM signal from a system; and a commutation logic unit for controlling the speed and rotation of a single phase DC brushless motor according to the PWM signal.

The present invention also provides a method for controlling the speed and rotation of a single phase DC brushless motor control, including: receiving a PWM signal; and controlling the speed and rotation of the single phase DC brushless motor according to the PWM signal.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 2:
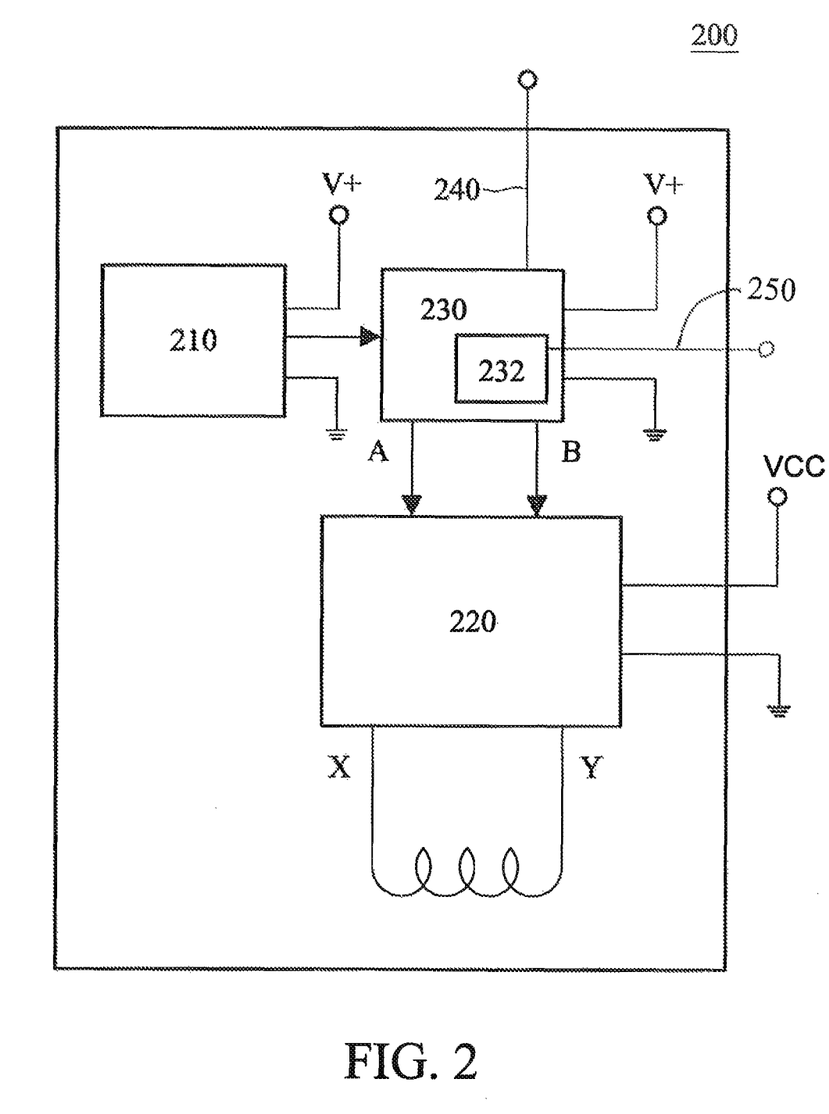
FIG. 2 is a schematic diagram of the single phase DC brushless motor controller according to one embodiment of the present invention.

FIG. 2 is a schematic diagram of the single phase DC brushless motor controller according to one embodiment of the present invention. The single phase DC brushless motor controller 200 of the present invention includes a Hall sensor 210, a magnetic field control unit 220 and a micro control unit 230. In addition to changing the speed of the single phase DC brushless motor, the single phase DC brushless motor controller 200 of the present invention can further change the rotation direction of the single phase DC brushless motor.

Figure 3:
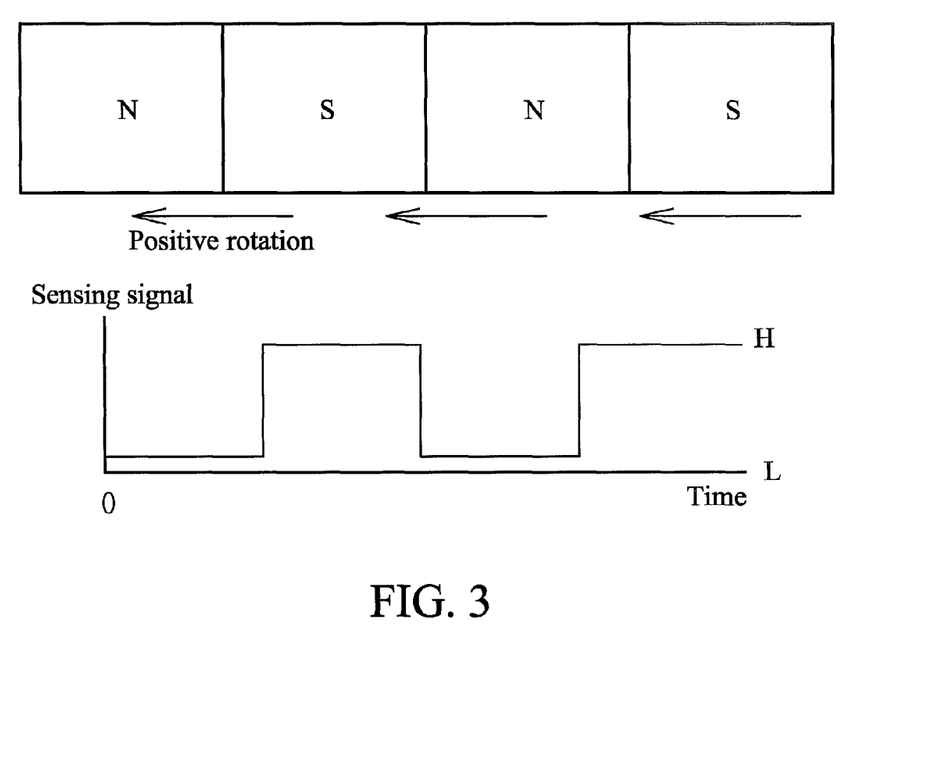
FIG. 3 illustrates the corresponding relationship between the magnetic field of the rotator 110 and the sensing signal provided by the Hall sensor 210.

The Hall sensor 210 can be disposed on one of the laminations of the stator 120 of the single phase DC brushless motor 100, as shown in FIG. 1. The Hall sensor 210 is coupled to the micro control unit 230, for sensing the magnetic field of the part of the rotator 110 right in front of the Hall sensor 210, and providing a sensing signal to the micro control unit 230. FIG. 3 illustrates the corresponding relationship between the magnetic field of the rotator 110 and the sensing signal provided by the Hall sensor 210. In this embodiment, the Hall sensor 210 outputs a high signal when the Hall sensor 210 senses the magnetic south pole of the rotator has, and outputs a low signal when the Hall sensor 210 senses the magnetic north pole of the rotator. As long as the rotator 110 keeps rotating, the Hall sensor 210 will alternatively output the high and low signals. Those skilled in the art can define the corresponding relationship between the magnetic field and the level of the sensing signal, and the present invention is not limited thereto.

The magnetic field control unit 220 of the present invention is used to change the magnetic field of the stator 120 of the single phase DC brushless motor 100 for driving the rotator 110 of the single phase DC brushless motor 100. The magnetic field control unit 220 of the present invention can produce a positive rotation magnetic field, a reverse rotation magnetic field, or eliminate all of the magnetic field to respectively make the rotator 110 of the single phase DC brushless motor 100 rotate positively, reversely, or stop. In an embodiment, "producing positive rotation" means that the magnetic field control unit 220 may produce a magnetic field on a lamination of the stator 120 of the magnetic field control unit 220, which repels the magnetic field of the rotator right in front of the lamination (for example, producing a magnetic N pole on the laminations 121 and 123). Meanwhile, "producing reversed rotation" means that the magnetic field control unit 220 may produce a magnetic field on the a lamination of the stator 120 of the magnetic field control unit 220, which attracts the magnetic field of the rotator right in front of the lamination (for example, producing a magnetic S pole on the lamination 121 and 123). Also, "eliminating the magnetic field" means that the magnetic field control unit 220 may make the lamination 121 non-magnetic. Specifically, the magnetic field control unit 220 may excite the magnetic coils of the laminations of the stator 120 with proper currents to produce the positive or reverse rotation magnetic field. In this embodiment, the magnetic coil of the lamination has a magnetic S pole when the current produced by the magnetic field control unit 220 is flowing from the high level X point to the low level Y point, and has a magnetic N pole when the current produced by the magnetic field control unit 220 is flowing from the high level Y point to the low level X point. Due to the nature of the design of the single phase DC brushless motor, the motor can only rotates in one way successfully, where the rotation in this way is a so-called positive rotation. Taking FIG. 1 for example, clockwise rotation is the positive rotation. Oppositely, the motor may fail to rotate in an opposite way, where the rotation in this way is a so-called reversed rotation. Taking FIG. 1 for example, counter clockwise rotation is the reversed rotation. It should be noted that in the embodiments, the expressions "positive rotation", "reverse rotation", "repel" or "attract" are used for illustration, and those skilled in the art may modify the expressions, thus, the present invention should not be limited thereto.

The micro control unit 230 of the present invention is coupled to the Hall sensor 210 and the magnetic field control unit 220, and is used for receiving the sensing signal from the Hall sensor 210 and controlling the magnetic field control unit 230 to further control the single phase DC brushless motor 100 in order to control the rotation direction of the stator 12 of the single phase DC brushless motor 100. The micro control unit 230 includes at least a commutation logic unit 232 for determining whether to change the rotation direction of the single phase DC brushless motor 100.

To accomplish the commutation of the rotation direction of the single phase DC brushless motor 100, the commutation logic unit 232 of the present invention further performs the following steps when determining that the commutation of the rotation direction of the single phase DC brushless motor 100 is needed: (1) the commutation logic unit first makes the magnetic field control unit 230 eliminate the magnetic field of the stator 120; and then, (2) makes the magnetic field control unit 230 generate a reverse rotation magnetic field at the time the single phase DC brushless motor 100 is still rotating under inertia-driven force circumstance. If the reverse rotation magnetic field is suddenly excited on the rotator 110 at the time the rotator 110 of the single phase DC brushless motor 100 stops or rotates positively, the rotator 110 may fail to rotate reversely due to the commutating dead angle. The present invention excites the reverse rotation magnetic field when the rotator 110 is still rotating under inertia-driven force circumstance, thus avoiding the commutating dead angle and making the rotator 110 rotate reversely. In an embodiment, to rotate the single phase DC brushless motor 100 reversely from a resting position, the commutation logic unit 232 of the present invention will rotate the single phase DC brushless motor 100 positively in advance, and then rotate it reversely by the steps described hereafter.

Figure 4A:
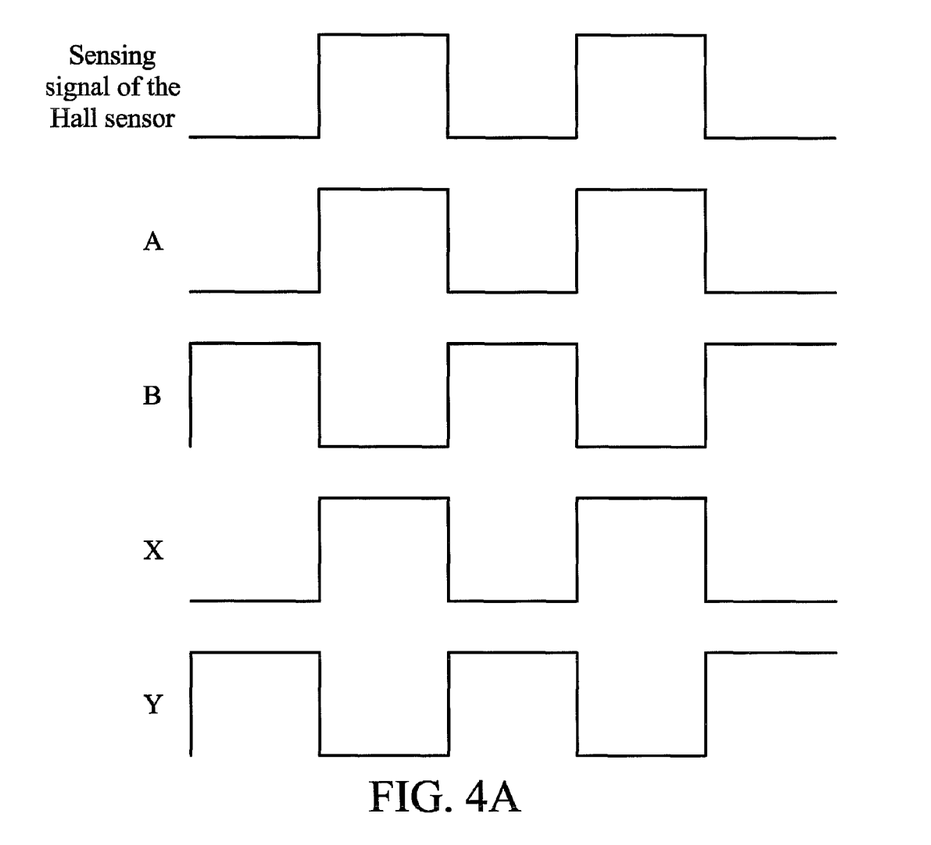
FIGS. 4A and 4B illustrate the actual logic state of the sensing signal of the single phase DC brushless motor controller 200.
Figure 4B:
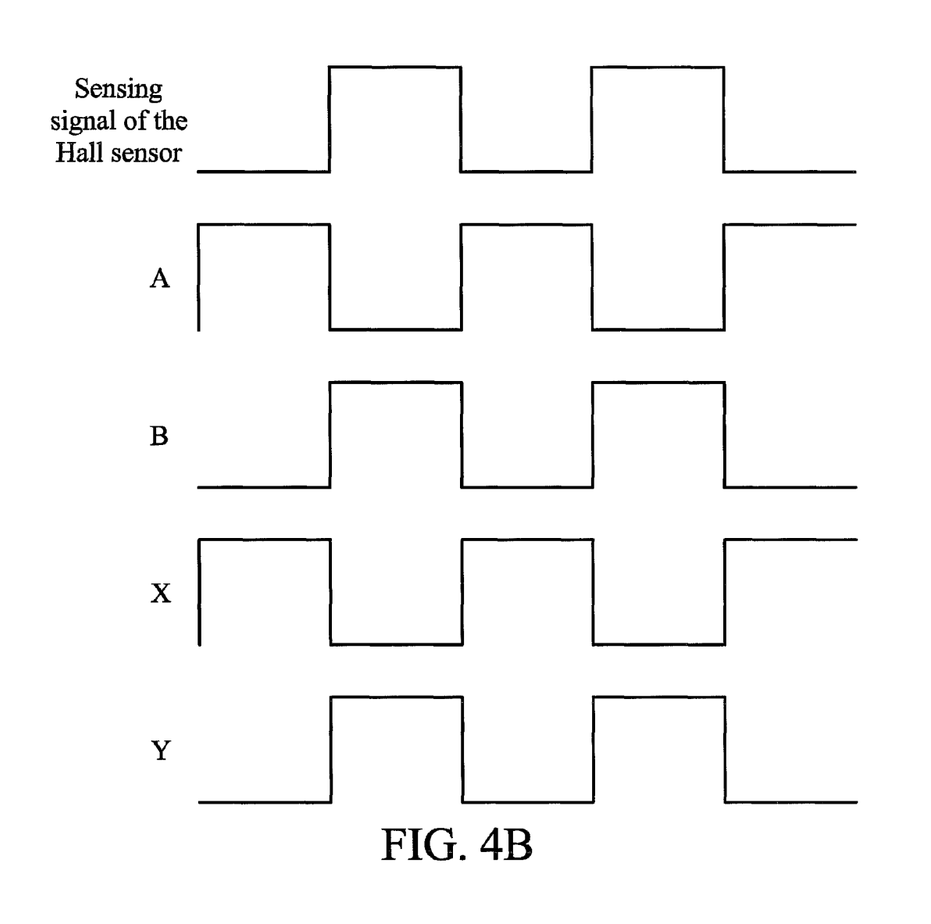

FIGS. 4A and 4B illustrate the actual logic state of the sensing signal of the single phase DC brushless motor controller 200. FIG. 4A is a timing diagram of the logic state of the Hall sensor 210, the micro control unit 230 and the magnetic field control unit 220 when the single phase DC brushless motor 100 rotates positively, and FIG. 4B is a timing diagram of the logic state of the Hall sensor 210, the micro control unit 230 and the magnetic field control unit 220 when the single phase DC brushless motor 100 rotates reversely.

Further, to rotate the motor 100 reversely, the commutation logic unit 232 may determine a best timing for making the magnetic field control unit 230 produce the reverse rotation magnetic field. In a better embodiment, the commutation logic unit 232 can determine the relative position between the rotator 110 and the stator 120 according to the sensing signal provided by the Hall sensor 210, and make the magnetic field control unit 232 produce the reverse rotation magnetic field at the time the single phase DC brushless motor is rotating to an angle other than the commutating dead angle. In FIG. 1, when the magnetic pole of the rotator 110 is right in front of the magnetic pole of the stator 120, the relative position between the rotator 110 and the stator 120 is a so-called commutating dead angle. In this embodiment, since the Hall sensor 210 is disposed on the edge of a lamination of the stator 120, the time the sensing signal outputted by the Hall sensor 210 changes its state is the time the motor leaves the commutation dead angle. Those skilled in the art may determine a best time to generate the reverse rotation magnetic field according to the present invention. In other embodiments, the Hall sensor 210 may be disposed on the other positions of the laminations, and the best time to generate the reverse rotation magnetic field may be adjusted according to the position of the Hall sensor 210.

Figure 5:
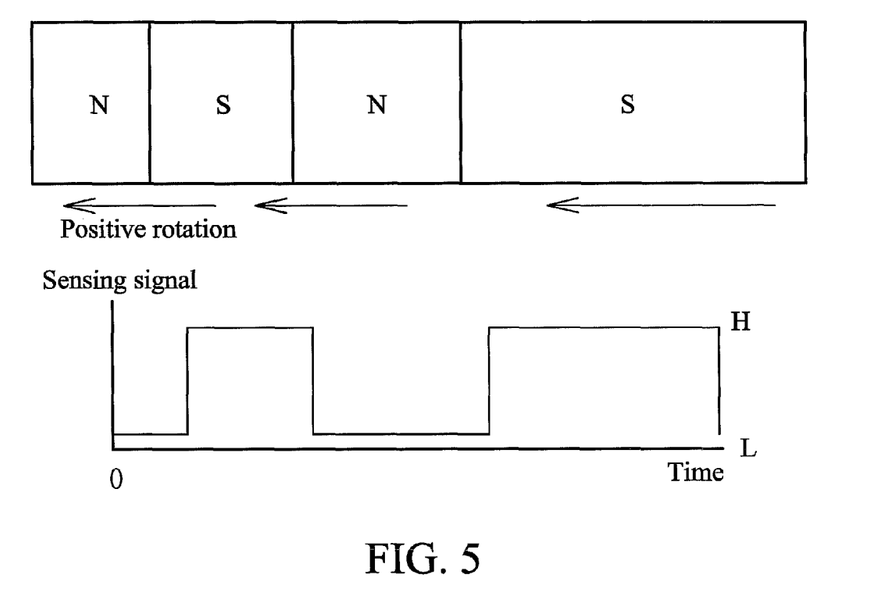
FIG. 5 shows the sensing signal provided by the Hall sensor 210 when the single phase DC brushless motor 100 is rotating under inertia-driven force circumstance.

In addition to the determination of the position of the rotator, the commutation logic unit 232 of the present invention may also determine the rotation speed of the motor 100. FIG. 5 shows the sensing signal provided by the Hall sensor 210 when the single phase DC brushless motor 100 is rotating under inertia-driven force circumstance. The increase of the duty cycle of the sensing signal means that the single phase DC brushless motor 100 is slowing down its speed. The commutation logic unit 232 of the present invention can calculate the variation of the rotation speed of the rotator 110 based on the variation of the duty cycle of the sensing signal, and make the magnetic field control unit 230 produce the reverse rotation magnetic field when the rotator 110 is about to rest (but not rest). Those skilled in the art can determine the best timing to generate the reverse rotation magnetic field according to the present invention.

The single phase DC brushless motor controller 200 of the present invention which can make the single phase DC brushless motor rotate in two directions is fully described in the preceding paragraphs. In addition, the present invention further provides a mechanism to start the rotation of the motors. Refer to FIG. 2, in an embodiment, the micro controller 200 further includes a pulse width modulation (PWM) pin 240, which is used to receive a PWM signal from a system (not shown) so that the commutation logic unit 232 of the present invention can control the rotation speed and direction of the single phase DC brushless motor 100 according to the PWM signal. In the prior art, a system usually controls the rotation speed of the motor through the PWM signal. Generally, the longer the duty cycle of the PWM signal, the higher the rotation speed, and the shorter the duty cycle of the PWM signal, the lower the rotation speed. In addition to the rotation speed, the PWM signal of the present invention can be used to control the rotation direction of the motor. The commutation logic unit 232 can determine whether to change the rotation direction of the single phase DC brushless motor 100 based on whether the duty cycle of the PWM is higher or lower than a predetermined duty cycle. For example, in an embodiment, the commutation logic unit 232 has a predetermined duty cycle of 0.5. When the duty cycle of the PWM signal is higher than the predetermined duty cycle of 0.5, the motor is determined to rotate positively, and when the duty cycle of the PWM signal is lower than the predetermined duty cycle of 0.5, the motor is determined to rotate reversely. In this embodiment, if the PWM signal is used to control both the rotation speed and rotation direction, the motor will be determined to rotate positively at 0~100% of its full speed when the duty cycle of the PWM signal is 0.5~1.0, and determined to rotate reversely at 0~100% of its full speed (determined to stop when the duty cycle of the PWM signal is zero). Those skilled in the art can modify the use of the PWM signal according to the embodiment of the present invention.

In other embodiment, the rotation speed and direction can be controlled based on signals other than the PWM signal. For example, the micro control unit 230 may additionally configure a commutation signal pin 250 for receiving a commutation signal from the system so that the commutation logic unit 232 can control the rotation direction of the single phase DC brushless motor 100 based on the commutation signal.

The present invention further provides a single phase DC brushless motor which is able to rotate in two directions. Since the provided motor has a structure which is equal to the combination of the single phase DC brushless motor 100 in FIG. 1 and the single phase DC brushless motor controller 200 in FIG. 2, detailed description will be emitted for brevity. In addition, the present invention further provides a single phase DC brushless motor system (not shown) which is able to make a motor rotate in two directions. Since the provided motor system has a structure which is equal to the combination of the single phase DC brushless motor 100 in FIG. 1, the single phase DC brushless motor controller 200 in FIG. 2 and a system for providing the PWM signal, detailed description will also be emitted for brevity.

The single phase DC brushless motor controller of the present invention can be directly used with the single phase DC brushless motor of the prior art to make the motor be able to rotate in two directions. For example, the single phase DC brushless motor controller can be used with a motor of a heat-dissipating fan so that the fan is able to blow or suck air, thus increasing the efficiency of heat dissipation. In another embodiment, this two-way heat dissipating fan can change its rotation direction to avoid dust accumulation on one side.

Figure 6:
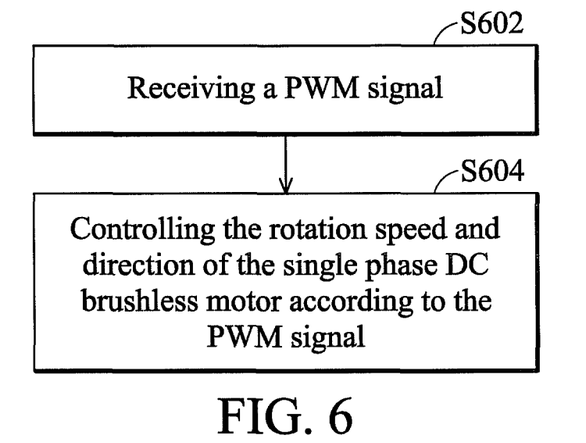
FIG. 6 is a flowchart of the method of the present invention.

In addition to the said apparatuses, the present invention further provides a method for controlling the rotation speed and direction of the single phase DC brushless motor. FIG. 6 is a flowchart of the method of the present invention. Referring to FIG. 1 and FIG. 6, the method for controlling the rotation speed and direction of the single phase DC brushless motor includes: in step S602, receiving a PWM signal; and in step S604, controlling the rotation speed and direction of the single phase DC brushless motor 100 according to the PWM signal. For example, whether to change the rotation direction of the single phase DC brushless motor 100 may be determined based on whether the duty cycle of the PWM signal is higher or lower than a predetermined duty cycle, which has been discussed in previous embodiments.

Figure 7:
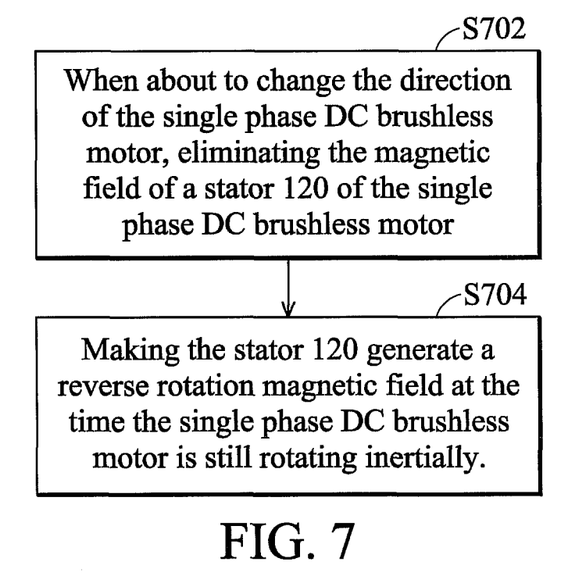
FIG. 7 is a flowchart of the method of the present invention for changing the rotation direction of the single phase DC brushless motor.

FIG. 7 is a flowchart of the method of the present invention for changing the rotation direction of the single phase DC brushless motor. The method includes: in step S702, when about to change the direction of the single phase DC brushless motor, eliminating the magnetic field of a stator 120 of the single phase DC brushless motor; and in step S704, making the stator 120 generate a reverse rotation magnetic field at the time the single phase DC brushless motor is still rotating under inertia-driven force circumstance.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A single phase DC brushless motor controller, comprising:
   a micro control unit comprising:
   a Pulse Width Modulation (PWM) pin for receiving a PWM signal from a system;
   a commutation logic unit for controlling the speed and rotation of a single phase DC brushless motor according to the PWM signal, wherein the commutation logic unit determines whether to change the rotation direction of the single phase DC brushless motor based on whether the duty cycle of the PWM signal exceeds a predetermined duty cycle, and
   a magnetic field control unit, coupled to the micro control unit, for being controlled by the micro control unit to change the magnetic field of a stator of the single phase DC brushless motor, wherein when the commutation logic unit is about to change the rotation direction of the single phase DC brushless motor, the commutation logic unit first makes the magnetic field control unit eliminate the magnetic field of the stator and then makes the magnetic field control unit generate a reverse rotation magnetic field at the time the single phase DC brushless motor is still rotating under inertia-driven force circumstance.

2. The single phase DC brushless motor controller as claimed in claim 1, further comprising a Hall sensor, disposed on the stator, coupled to the micro control unit, for sensing the magnetic field of the part of a rotator of the single phase DC brushless motor which is right in front of the Hall sensor, and providing a sensing signal to the micro control unit, wherein the commutation logic unit determines which part of the rotator is facing the stator according to the sensing signal, and makes the magnetic field control unit generate the reverse rotation magnetic field at the time the rotator rotates under inertia-driven force circumstance to an angle other than the commutating dead angle.

3. The single phase DC brushless motor controller as claimed in claim 2, wherein the commutation logic unit further determines the rotation speed of the rotator based on the sensing signal provided by the Hall sensor, and makes the magnetic field control unit generate the reverse rotation magnetic field when the rotator is about to rest.

4. The single phase DC brushless motor controller as claimed in claim 1, wherein the micro control unit further comprises a commutation signal pin for receiving a commutation signal from the system.

5. The single phase DC brushless motor controller as claimed in claim 4, wherein the commutation logic unit further controls the rotation of the single phase DC brushless motor based on the commutation signal.

6. A method for controlling the speed and rotation of a single phase DC brushless motor control, comprising:
   receiving a PWM signal; and
   controlling the speed and rotation of the single phase DC brushless motor according to the PWM signal,
   determining whether to change the rotation direction of the single phase DC brushless motor based on whether the duty cycle of the PWM signal exceeds a predetermined duty cycle,
   when about to change the direction of the single phase DC brushless motor, eliminating the magnetic field of a stator of the single phase DC brushless motor; and
   making the stator generate a reverse rotation magnetic field, at the time the single phase DC brushless motor is still rotating under inertia-driven force circumstance.

* * * * *